United States Patent [19]

Allen et al.

[11] Patent Number: 5,534,035

[45] Date of Patent: Jul. 9, 1996

[54] LEATHER TREATMENT COMPOSITIONS

[75] Inventors: Adrian S. Allen, Skipton; Finlay D. Aiston, Huddersfield, both of United Kingdom

[73] Assignee: Allied Colloids Limited, England

[21] Appl. No.: 108,197

[22] Filed: Aug. 18, 1993

[30] Foreign Application Priority Data

Aug. 18, 1992 [GB] United Kingdom .................... 9217547

[51] Int. Cl.$^6$ ...................................................... C14C 9/00
[52] U.S. Cl. ............................... 8/94.21; 8/94.18; 8/94.33; 252/8
[58] Field of Search ............................... 8/94.1 R, 94.18, 8/94.21, 94.23; 252/8.57; 526/318, 318.4, 315.24

[56] References Cited

U.S. PATENT DOCUMENTS 5,124,181 6/1992 Schaffer et al. ..................... 252/8.57
5,279,613 1/1994 Schaffer et al. ..................... 252/8.57

FOREIGN PATENT DOCUMENTS

60227/90 2/1991 Austria .
372746 6/1990 United Kingdom .

Primary Examiner—Jeffrey T. Smith
Attorney, Agent, or Firm—Dickstein, Shapiro & Morin

[57] ABSTRACT

A copolymer for use in rendering leather water repellant is formed from ethylenically unsaturated monomer and ethylenically unsaturated monofunctional monomer, wherein the monomers include mono- or di- fatty alkyl ester of dicarboxylic acid and a free carboxylic acid monomer and provide a carboxylic acid equivalent weight of 100 to 1000 and at least 20% by weight of fatty alkyl groups.

20 Claims, No Drawings

05,534,035

LEATHER TREATMENT COMPOSITIONS

This invention relates to the treatment of leather to render it water-repellant, and to compositions for this purpose and copolymers that can be used as the essential active ingredient in such compositions.

The treatment of leather with an aqueous solution or dispersion of certain polymeric materials can be applied for retanning the leather or, preferably, for rendering the leather water-repellant, often combined with retanning.

In AU-A-90/60227 and EP-A-412389, leather is rendered water-repellant by treatment with a copolymer of a monoolefin and a $C_{4-8}$ dicarboxylic anhydride, e.g., a copolymer of a commercial $C_{20-24}$ olefin and maleic anhydride. This process is not very economic or effective.

In EP-A-372746 a retanning and fat liquoring process is described that involves the use of a copolymer of an acidic or basic monomer (such as acrylic acid) with a fatty monomer selected from long chain (fatty) alkyl (meth) acrylates vinyl esters of long chain alkyl carboxylic acids and long chain alkoxy- or alkylphenoxy (polyethylene oxide)-(meth) acrylates. Although some of these products are reasonably effective, they are expensive to make because of the difficulty of synthesis and cost of the fatty monomer and its polymerisation, in the amounts that have to be used. For instance the manufacture of fatty (meth) acrylate in adequate purity is a rather difficult and costly process Our object is to provide a novel copolymer that gives good water-repellant performance when applied appropriately to leather and which can be formed easily from very readily available and cost effective monomers. A further object is to provide treatment compositions containing such copolymers, methods of rendering leather water-repellant using such compositions, and leather that has been rendered water-repellant.

According to the invention we provide a novel copolymer polymerised from monomers comprising (a) ethylenically unsaturated dicarboxylic monomer and (b) ethylenically unsaturated monofunctional monomer in an amount of at least substantially 1 mole of monofunctional monomer per mole of dicarboxylic monomer, and in which the monomers include mono- or di- $C_{8-24}$ alkyl ester of ethylenically unsaturated dicarboxylic acid and ethylenically unsaturated free carboxylic acid monomer wherein the amount of ethylenically unsaturated free carboxylic acid monomer is such that the polymer has a CAEW (carboxylic acid equivalent weight as defined herein) of 100 to 1000 and the said mono- or di- alkyl ester and its amount are such that the polymer contains at least 20%, by weight of the polymer, of fatty alkyl groups having an average chain length (as defined herein) of at least 12 carbon atoms.

The invention includes the novel copolymers, an aqueous solution or dispersion of such a copolymer, a method in which leather is impregnated with such a composition and then dried, and leather that has been retanned and/or rendered water-repellant as a result of being impregnated throughout with such a copolymer.

The specified CAEW value is an indication of the presence of a required proportion of free carboxylic acid groups. These may be provided by the ester in monomer (a) when that ester is a mono-ester or they may be provided by some other ethylenically unsaturated monomer that provides free carboxylic acid groups. Such monomer is referred to below as a "free carboxylic acid monomer". In all instances, the free carboxylic acid groups may be present as free acid or as water-soluble salt or, when the monomer is a dicarboxylic acid monomer, as anhydride.

When the ester in monomer (a) is a mono-ester, this ester will serve also as part or all of the free carboxylic acid monomer and it may then be possible to obtain the desired CAEW without the inclusion of other free carboxylic acid monomer. However when the ester in monomer (a) is a diester then it is essential to include free carboxylic acid monomer. Generally it is preferred to include free carboxylic monomer additional to the ester.

The free carboxylic acid monomer may have, for instance, one or two free carboxylic acid groups. Thus it may include free monocarboxylic acid monomer such as (meth) acrylic acid but preferably the free carboxylic acid monomer consists of or includes free dicarboxylic acid monomer, which thus is part of monomer (a). Suitable dicarboxylic monomers are maleic, fumaric and itaconic acids. Although it is preferred that the free carboxylic acid monomer should consist of free dicarboxylic monomer a mixture of one part free dicarboxylic acid monomer with, for instance, 0.1 to 1 part free monocarboxylic acid monomer can be used.

The carboxylic groups in the free carboxylic acid monomer (which can include the mono-ester of monomer (a)) can be in the form of water-soluble salt such as amine, ammonium or alkali metal salt or, partial salt or for dicarboxylic monomers, anhydride groups. When monocarboxylic monomer is used, it may form part of monomer (b).

The $C_{8-24}$ alkyl ester of dicarboxylic acid is usually a mono alkyl or dialkyl ester of maleic, fumaric or itaconic acid with a long chain aliphatic alcohol. The ester monomer may be formed from a mixture of fatty alcohols, giving a mixture of alkyl groups, or by blending ester monomer formed from different fatty alcohols. The synthesis of such monomers can be conducted easily in known manner, e.g. by reacting maleic acid or anhydride with the chosen fatty alcohol, and so the fatty monomer is readily and economically available.

The average carbon chain length contributed by the fatty alkyl groups is generally at least 10 but below 20. Preferably the average carbon chain length is at least 12 and most preferably $C_{16-18}$. The average carbon chain length is defined as the sum of the weight percent of each alkyl chain length multiplied by that alkyl chain length. For example if the alkyl group is provided as a mixture of 4% $C_{12}$, 6% $C_{14}$, 38% $C_{16}$, 46% $C_{18}$, 14% $C_{20}$ and 2% $C_{22}$ (all weight %) then the average carbon chain length is $$\frac{4 \times 12}{100} + \frac{6 \times 14}{100} + \frac{38 \times 16}{100} + \frac{46 \times 18}{100} + \frac{4 \times 20}{100} + \frac{2 \times 22}{100} = 16.92.$$

The dicarboxylic monomers (a) used in the invention are preferably $\alpha,\beta$ dicarboxylic monomer. These monomers do not homopolymerise or copolymerise satisfactorily by themselves and so are copolymerised with at least a substantially equimolear amount of ethylenically unsaturated monofunctional monomer (b). This monomer (b) has only one functional group pendant to the ethylenic group in contrast to monomer (a). A major purpose of the monofunctional monomer is therefore to facilitate polymerisation, as a copolymer, of the dicarboxylic monomer (a). A main requirement of monofunctional monomer (b) therefore is that it should be any monofunctional monomer that is capable of facilitating polymerisation of the dicarboxylic monomer as a copolymer.

The monofunctional monomer (b) generally comprises relatively water-insoluble monomer but some soluble monomer, for instance free carboxylic acid monomer may be included. Often at least 50% by weight, and frequently at least 80%, by weight of the monofunctional monomer is a relatively water-insoluble monomer, and it is frequently preferred that the monofunctional monomer should consist substantially only of water-insoluble monomer. Thus the amount of water-insoluble monomer is usually at least about 1 mole per mole of dicarboxylic monomer (a).

Water-insoluble monomer suitable for this purpose generally has a solubility in deionised water at 25° C. of less than 10% and frequently less than 5% by weight. Suitable monofunctional water-insoluble monomers for use in the invention typically are selected from vinyl esters such as vinyl acetate, styrenes such as styrene or α-methyl styrene, vinyl ethers, olefins such as ethylene and other insoluble monomers such as alkyl (meth) acrylates, especially when the alkyl group is $C_{1-4}$ alkyl. It is possible for the monofunctional insoluble monomer to include fatty groups, for instance a fatty alkyl methacrylate, but this is generally undesirable since it reintroduces the problems of the prior art that can be avoided in the invention by the use of fatty monomers such as fatty alkyl maleate. Accordingly the insoluble monofunctional monomer is preferably free of fatty alkyl monomer and if any such monomer is included the amount is usually low, for instance not more than 10% by weight of the water insoluble monomer.

As indicated above, free monocarboxylic acid monomer may be included as part of the monofunctional monomer, and minor additions of other monomers may be included as part of the monofunctional monomer, for instance to reduce the cost of the material without significantly affecting the properties. Typical amounts of such other monomers range up to about 10% by weight of the copolymer or about 20% by weight of the monofunctional monomer.

These monomers include acrylonitrile, acrylamide, acrylamidomethylpropanesulphonic acid, sodium styrene sulphonate or any other polymerisable monomer that does not detract from the performance of the copolymer.

The preferred polymers are formed from 20 to 60 (generally 20 to 50) mole % of the fatty dicarboxylic ester monomer, 0 to 40 (generally 0 to 30) mole % of free dicarboxylic acid monomer, and 40 or 50 to 75 (generally 55 to 65) mole % of the described water-insoluble monomer. Up to 10 mole %, or sometimes more, of other monomers may be included. When the fatty monomer is a diester, the amount of free dicarboxylic acid monomer must usually be above 20 mole %.

The invention is based partly on the discovery that good properties can be obtained in a very cost effective polymer by a combination of fatty dicarboxylic ester monomer with other water insoluble and generally non-fatty monomer, and partly on the discovery that good properties depend on a proper balance between the carboxylic acid (or salt) content and the fatty content.

If the free acid (and salt) content is too high (as represented by a low CAEW value) the copolymer will be too water soluble and so will wash out too easily. Similarly the fatty content must not be too low.

If the carboxylic acid content is too low and/or the fatty content is too high, the polymer will not adequately penetrate the leather structure and/or will not bind adequately into the leather, and so will not give water repellance. For instance we believe it is important in the invention to provide sufficient free carboxylic acid groups in the polymer to react with terminal amino groups in the collagen or other proteins in leather, so as to bond the polymer to the leather.

In particular we find that fatty alkyl groups having an average chain length above 12 are present in an amount of above 20% by weight of the polymer. Some shorter chain groups can additionally be present but generally the average of all the $C_{8-24}$ alkyl groups is above 12. If extra shorter chain fatty group (e.g., $C_{8-10}$) is present, this can be useful but is inadequate unless there is at least 20% (by weight of the polymer) with an average length above 12 carbon.

Preferably at least 30% of the weight of the polymer is provided by fatty alkyl groups having an average chain length above 12. Generally it is not more than 60%.

The Carboxylic Acid Equivalent Weight of the copolymer is in the range 100 to 1000 but is preferably at least 200, often at least 300, and often up to 500. These values are grams per mole of carboxylic acid. The method for determining the Carboxylic Acid Equivalent Weight of the copolymer is as follows. The copolymer may be as a solution or dispersion of the copolymer in a solvent or water or may be a solid. It may be as a free acid or wholly or partially neutralised.

Enough material is taken to contain approximately 3 g of polymer and is accurately weighed. 25 ml of isopropyl alcohol are added and heated if necessary to up to 80° C. to dissolve the polymer to form a homogeneous solution or dispersion free of solid particles. 150 ml of deionised water are added and the solution or dispersion is stirred with a magnetic stirrer. The pH of the solution or dispersion is adjusted to 1.7 with 1N HCl and then the material is potentiometrically titrated using a freshly buffered pH meter versus 1N NaOH. Readings of pH are taken after every 0.5 ml addition of 1N NaOH allowing about 30 seconds for each reading to stabilise before adding a further 0.5 ml aliquot of 1N NaOH.

Addition of 1N NaOH is continued in this way up to a pH of 12.0 to 12.5 or until both end points have been observed. A graph of pH is plotted versus mls of 1 NaOH added and the two end points determined or constructed at the position where the differential δpH/δ volume of 1N NaOH is a maximum.

The end points are at approximately pH 3 and pH 9.5. The titre t mls is the volume of 1N NaOH added between these two endpoints. The Carboxylic Acid Equivalent Weight is defined as:

$$C.A.E.W. = \frac{1000 \times wt}{t \times N} \quad g/mole. \; COOH$$

where t is the titre (ml) defined above

N is the normality of the NaOH solution wt is the weight of copolymer titrated.

If the copolymer is a solution or dispersion in a volatile solvent or water then the weight is defined as the dry weight and is determined as follows:

1 g of polymer solution or dispersion is accurately weighed on an aluminium dish or watch glass pre-dried by previously heating at 110° C. for 1 hour and cooling in a desiccator. The material is dried in a fan heated over at 110° C. for 1 hour and cooled in a desiccator. The dry weight is:

$$Dry \; Weight = \frac{Wt \; of \; dry \; sample - Wt \; of \; dish}{Wt \; of \; sample - Wt \; of \; dish} \times 100\%$$

If the polymer is for some reason dissolved or dispersed in a non-volatile or high boiling solvent then its equivalent weight must be determined prior to dissolving or dispersing.

The weight average molecular weight of the copolymer is preferably above 1000, often above 10000, up to 100,000 g/mole measured by GPC (gel permeation chromatography) using tetrahydrofuran as solvent and poly methylmethacrylate standards.

Common chain transfer reagents such as 2-mercaptoethanol, thioglycollic acid, n-dodecyl mercaptan, isopropyl alcohol, ethyl alcohol or formic acid may be used to control molecular weight. Alternatively polymerisation conditions such as high temperature and high initiator levels may be used to control molecular weight. Conventional free radical azo or peroxy initiators may be used.

The polymerisation method can be bulk, solution, suspension or dispersion polymerisation but bulk and solution polymerisation are preferred. For example, the polymer can be made by polymerisation of the monomers dissolved in iso propyl alcohol (typically 0.1 to 1 part per part weight monomer) for at least 1 hour, e.g. 2 to 15 hours often 3 to 10 hours.

The copolymer is usually provided for use as a composition which is a solution or dispersion of 15 to 40% polymer in water. The composition is normally neutralised to pH above 5.5, e.g. to pH 6 to 8, with sodium hydroxide or other alkali to put the carboxylic groups into salt form.

The composition is usually applied to the leather at a level of from 0.5% to 10%, preferably 2% to 5%, on weight of leather. Application may be by immersion or coating followed by rinsing and drying in conventional manner.

The following are Examples of the invention.

EXAMPLE 1

295.3 gms of mono- ceto- stearyl maleate (CSMA average carbon number of alkyl groups is 17.0) and 9.1 g of maleic anhydride were mixed and melted together at 70° C. in a 1 liter resin pot. 2.5 g of water were added and stirred for 10 minutes to hydrolyse the maleic anhydride to maleic acid and the flask was deoxygenated with nitrogen gas. 25.5 g of isopropyl alcohol and 95.6 g of vinyl acetate were added followed by 2.16 g of Vago 67 (trademark for an azo initiator produced by E. I. Dupont de Nemours and Co.) dissolved in 10 gms of isopropyl alcohol. The mix was stirred continuously and a slight positive pressure of nitrogen gas maintained to keep an inert atmosphere in the resin pot. The contents were heated to reflux at 89° C. and a solution of 5.84 g of Vago 67 dissolved in 40 g of isopropyl alcohol was fed into the reaction mass at a constant rate over a period of 2 hours during which time the reflux temperature of the mass dropped to 86° C.

After a further 2 hours the reflux temperature was 88° C. and another 4 g of Vago 67 dissolved in 10 g of isopropyl alcohol were added. The mass was maintained at reflux for a further 6 hours during which time the temperature was gradually increased to 94° C. The molten mass was cooled to 80° C. and transferred to a 3 liter resin pot containing 36.7 g of sodium hydroxide dissolved in 1882 g of water stirring at 60° C.

The mass was mixed until homogeneous then cooled to 25° C. producing a dispersion of a copolymer of 0.9 mole ceto-stearyl maleate (M.W. 354), 0.1 mole maleic acid and 1.2 mole vinyl acetate 90% neutralised as the sodium salt at 18% w/w solids in water. The free acid copolymer had a hydrocarbon side chain content of 49.6% w/w and a carboxylic acid equivalent weight of 394 gm/mole of —COOH.

About 50 g of wet blue leather was cut (about 20 cm by 12 cm) and accurately weighed. This was placed in a drum with 100 g of water at 40° C. and 0.1 gram of a non-ionic emulsifier (Sunaptol MB, trademark,—ICI Ltd.). The leather was thus rinsed for 5 minutes to remove loose chrome salts. The liquor was drained and the leather rinsed with 100 g water at 40° C. for 5 minutes then the liquor drained again. 100 g water at 40° C. and 1 g of Neutraktan D were added and drummed for 45 minutes to neutralise the leather at pH 5.5 The drum was drained and the leather rinsed with 100 g water at 40° C. for 5 minutes then drained again. 100 g of water at 50° C. was added along with 4.2 g of the above polymer dispersion (1.5% polymer on weight of leather) and treated for 90 minutes at 50° C. Coriacide Brown 3J dyestuff was added at 0.5% on weight of leather (0.25 g) and treatment continued for 45 minutes followed by addition of fat liquor (Chromoisol FO) at 3% on weight of leather (1.5 g) and treatment continued at 50° C. for a further 60 minutes after which time 1% formic acid (0.5 g) was added and treated a further 30 minutes. The drum was emptied, the leather rinsed with 100 g of water for 5 minutes then horsed up, (i.e. applied over a tanning horse) dried, conditioned and staked.

The treated leather was tested for waterproofness by observing how long a drop of water placed on the grain surface took to penetrate the leather at 20°–25° C.

| Leather | Time taken for water drop to penetrate |
| --- | --- |
| Treated with 1.5% copolymer of Example 1 | No penetration after 60 minutes |
| No copolymer treatment | 4 seconds |

The leather was also dyed level and was flexible and supple.

EXAMPLE 2–11

Copolymers were prepared by the same general method given in Example 1.

| Example/ | Molar Ratios of Monomers | | | | | | | | | |
| --- | --- | --- | --- | --- | --- | --- | --- | --- | --- | --- |
| | 2 | 3 | 4 | 5 | 6 | 7 | 8 | 9 | 10 | 11 |
| Monomer | | | | | | | | | | |
| MCSM | 1 | 1 | 0.8 | 0.7 | 0.6 | 0.5 | 0.4 | — | — | 0.7 |
| DCSM | — | — | — | — | — | — | — | 0.5 | 0.3 | — |
| MA | — | — | 0.2 | 0.3 | 0.4 | 0.5 | 0.6 | 0.5 | 0.7 | — |
| IA | — | — | — | — | — | — | — | — | — | 0.3 |
| VA | 1.1 | — | 1.2 | 1.2 | 1.2 | 1.2 | 1.2 | 1.2 | 1.2 | 1.2 |
| St | — | 1.1 | — | — | — | — | — | — | — | — |
| % HC w/w | 53.3 | 51.0 | 46.7 | 43.4 | 39.6 | 35.3 | 30.4 | 52.3 | 39.6 | 42.9 |
| C.A.E.W. | 449 | 468 | 341 | 297 | 259 | 226 | 197 | 457 | 259 | 300 |

Where:

MCSM is mono ceto stearyl maleate of molecular weight 354.

DCSM is di- ceto stearyl maleate of molecular weight 592.

MA is maleic acid of molecular weight 116.
IA is itaconic acid of molecular weight 130.
VA is vinyl acetate of molecular weight 86.
St is styrene of molecular weight 104.
% HC w/w is the weight percent of hydrocarbon or alkyl sidechain groups in the polymer.
C.A.E.W. is the carboxylic acid equivalent weight of the polymer in gm per mole of —COOH.

These copolymers were used to treat leather in the same way as Example 1 and all gave waterproof leather with no water penetration after 60 minutes.

EXAMPLES 12–16

Copolymers of 0.7 moles of mono alkyl maleate, 0.3 moles maleic acid and 1.2 moles vinyl acetate were prepared by the general method used in Example 1.

| Example | 12 | 13 | 14 | 15 | 16 |
|---|---|---|---|---|---|
| Average Carbon Number of Alkyl in mono-alkyl maleate | 8 | 10 | 12.7 | 18.0 | 21.6 |
| % HC w/w | 26.6 | 31.1 | 36.4 | 44.8 | 48.8 |
| C.A.E.W. | 229 | 244 | 264 | 304 | 328 |

Examples 12 and 13 are comparative examples.

Leather treated with these copolymers as in Example 1 were tested for waterproofness.

| Leather Example | Time for water to penetrate |
|---|---|
| 12 | 40 seconds |
| 13 | 55 seconds |
| 14 | No penetration after 60 mins |
| 15 | " |
| 16 | " |

Comparative Examples 17–20

| Example/ Monomer | Mole Ratio of Monomers | | | |
|---|---|---|---|---|
| | 17 | 18 | 19 | 20 |
| MA | — | — | 0.8 | 0.9 |
| MCSM | 0.3 | 0.5 | 0.2 | 0.1 |
| DCSM | 0.7 | 0.5 | — | — |
| VA | 1.2 | 1.1 | 1.2 | — |
| St | — | — | — | 1.3 |
| % HC w/w | 65.1 | 63.1 | 17.9 | 8.7 |
| C.A.E.W. | 2079 | 1135 | 148 | 145 |

Leather treated with copolymers as in Example 1 were tested for waterproofness.

| Leather Example | Time for water to penetrate |
|---|---|
| 17 | 1 minute 30 second |
| 18 | 2 minutes |
| 19 | 30 seconds |
| 20 | 30 seconds |

None of the comparative copolymers effectively waterproofed the leather.

Leathers 17 and 18 were not uniformly dyed.

We claim:

1. In a method of rendering leather water repellent by treating the leather with an aqueous solution or dispersion of a co-polymer which contains fatty $C_{8-24}$ alkyl groups and free carboxylic acid groups and which is formed by co-polymerizing ethylenically unsaturated monomers which provide the $C_{8-24}$ alkyl groups and the free carboxylic acid groups, the improvement consisting in using as the co-polymer a co-polymer which has a free carboxylic acid content such that the co-polymer has a carboxylic acid equivalent weight of 100 to 1,000 and which has at least 20%, by weight of the co-polymer, of fatty $C_{8-24}$ alkyl groups having an average chain length of at least twelve carbon atoms and which has been made by co-polymerizing monomers which comprise ethylenically unsaturated di-carboxylic monomer and at least about one mole ethylenically unsaturated mono-functional monomer per mole dicarboxylic monomer, and wherein the ethylenically unsaturated dicarboxylic monomer includes ethylenically unsaturated dicarboxylic ester monomer which provides essentially all the fatty $C_{8-24}$ alkyl groups in the polymer and which is selected from $C_{8-24}$ mono- and di-alkyl esters of ethylenically unsaturated di-carboxylic acid.

2. A method according to claim 1 in which the amount of free carboxylic acid monomer is such that CAEW is 200 to 500.

3. A method according to claim 1 in which the said mono- or di- alkyl ester and its amount are such that the polymer contains 30 to 60% by weight of fatty alkyl groups having an average chain length above 12.

4. A method according to claim 1 in which the average chain length of all the $C_{8-24}$ alkyl groups in the said ester is above 12.

5. A method according to claim 1 in which the polymer is formed from 50 to 75 mol % of the monofunctional monomer, 20 to 50 mol % of the said mono- or di-alkyl ester and free dicarboxylic acid monomer in an amount of 20 to 40 mol % when the alkyl ester is a dialkyl ester and in an amount of 0 to 40 mol % when the said mono- or di-alkyl ester includes at least 20mol % of the said mono alkyl ester.

6. A method according to claim 1 in which the said mono or dialkyl ester is a mono or dialkyl ester of maleic acid with long chain aliphatic alcohol.

7. A method according to claim 1 in which said mono ethylenically unsaturated monomer comprises water-insoluble monomer having a solubility in deionised water at 25° C. of less than 10%.

8. A method according to claim 7 in which the mono ethylenically unsaturated monomer is substantially free of fatty alkyl monomer and comprises 80 to 100% by weight of the water-insoluble monomer and 0 to 20% by weight of free mono carboxylic acid monomer or other water-soluble monomer.

9. A method according to claim 7 in which the water-insoluble monomer is selected from the group consisting of vinyl esters, styrenes, vinyl ethers and olefins.

10. A method according to claim 1 in which the copolymer has a molecular weight of from 1,000 to 100,000.

11. A method according to claim 1 in which the aqueous solution or dispersion has pH of at least 6.

12. In a method of rendering leather water repellent comprising treating the leather with an aqueous solution or dispersion of a co-polymer which contains fatty $C_{8-24}$ alkyl groups and free carboxylic alkyl groups, the improvement consisting in forming the co-polymer by polymerization of monomers consisting essentially of:

20 to 60 mole percent ethylenically unsaturated fatty alkyl monomer which provides essentially all the said fatty alkyl groups in the polymer and wherein the fatty alkyl monomer is selected from the group consisting of mono $C_{8-24}$ alkyl ester of ethylenically unsaturated dicarboxylic acid and di $C_{8-24}$ alkyl ester of ethylenically unsaturated dicarboxylic acid, 0 to 40 mole percent ethylenically unsaturated free dicarboxylic acid, 40 to 75 mole percent water insoluble ethylenically unsaturated mono-functional monomer essentially free of fatty alkyl groups and selected from the group consisting of vinyl esters, styrenes, vinyl ethers, ethylene, and $C_{1-4}$ alkyl(meth)acrylate, and 0 to 10 mole percent monomer selected from ethylenically unsaturated free mono carboxylic acid, acrylonitrile, acrylamide, acrylamido methyl propane sulphonic acid, and sodium styrene sulphonate, wherein the monomers include ethylenically unsaturated free carboxylic acid monomer in an amount such that the polymer has a carboxylic acid equivalent weight of 100 to 1000 and said fatty alkyl monomer is present in an amount such that the polymer contains at least 20% by weight of the polymer of fatty alkyl groups having an average chain length of at least 12 carbon atoms.

13. A method according to claim 12 in which the amount of free carboxylic acid monomer is such that carboxylic acid equivalent weight is 200 to 500.

14. A method according to claim 12 in which the said mono- or di- alkyl ester and its amount are such that the polymer contains 30 to 60% by weight of fatty alkyl groups having an average chain length above 12.

15. A method according to claim 12 in which the average chain length of all the $C_{8-24}$ alkyl groups in the said ester is above 12.

16. A method according to claim 12 in which the polymer is formed from 50 to 75 mol % of the monofunctional monomer, 20 to 50 mol % of the said fatty alkyl monomer and free dicarboxylic acid monomer in an amount of 20 to 40 mol % when the alkyl ester is a dialkyl ester and in an amount of 0 to 40 mol % when the said fatty alkyl monomer includes at least 20 mol % of the said mono alkyl ester.

17. A method according to claim 12 in which the said mono or dialkyl ester is a mono or dialkyl ester of maleic acid with long chain aliphatic alcohol.

18. A method according to claim 12 in which the copolymer has a molecular weight of from 1,000 to 100,000.

19. A method according to claim 12 in which the aqueous solution or dispersion has pH of at least 6.

20. A method according to claim 12 wherein said monofunctional monomer is selected from the group consisting of vinyl acetate, styrenes and vinyl ethers.

\* \* \* \* \*